United States Patent [19]
Jones et al.

[11] Patent Number: 4,911,411
[45] Date of Patent: Mar. 27, 1990

[54] CLEAN GAS VALVE USING A METAL-TO-METAL SEAL

[75] Inventors: Michael E. Jones, Los Ososo; Joseph H. Nichols, San Luis Obispo; Ronald G. Hendry, Los Osos, all of Calif.; Charles M. Obermeyer, Littleton, Colo.

[73] Assignee: Cryolab, Inc., San Luis Obispo, Calif.

[21] Appl. No.: 335,378

[22] Filed: Apr. 10, 1989

[51] Int. Cl.$^4$ ............................................. F16K 31/00
[52] U.S. Cl. ................................................. 251/335.3
[58] Field of Search ...................................... 251/335.3

[56] References Cited

U.S. PATENT DOCUMENTS 2,391,808 12/1945 Vincent ............................ 251/335.3
4,515,344 5/1985 Gemignani ....................... 251/335.3

FOREIGN PATENT DOCUMENTS 674901 4/1939 Fed. Rep. of Germany ... 251/335.3
7429 12/1976 U.S.S.R. ............................ 251/335.3

*Primary Examiner*—A. Michael Chambers
*Attorney, Agent, or Firm*—Daniel C. McKown

[57] ABSTRACT

A sealed valve intended for use in ultrahigh purity applications uses a metal-to-metal seal in a crucial, but unacessible, portion of the valve. The metal-to-metal seal avoids the use of a weld which because of the location could not be adequately cleaned, and avoids the use of an O-ring seal. The O-ring seal typically would have a leak rate on the order of $10^{-7}$ standard cubic centimeters per second of helium, but the metal-to-metal seal provides a leakage rate of less than $10^{-13}$ sccm/s. In the preferred embodiment, the seal is formed by forcing a conical part into the opening of a bore. The force used is small emough to avoid permanent deformation of the sealing parts, and thus the seal can be opened and closed any number of times without degradation.

7 Claims, 2 Drawing Sheets

CLEAN GAS VALVE USING A METAL-TO-METAL SEAL

BACKGROUND OF THE INVENTION

1. Field of the Invention

The present invention grew out of the needs of the semiconductor industry for a sealed gas valve that has extremely low leakage and that does not introduce contaminants into the system in which it is installed. The gases whose flow is controlled by such valves are extremely pure and in some instances are aggressive, corrosive, toxic, or flammable.

The present invention employs a bellows that extends to close the valve and that contracts to open it, whereby the high purity gas flowing through the valve remains sealed from the ambient air.

2. The Prior Art

In earlier sealed valves, the seal was maintained by an O-ring, and the lowest leak rates were on the order of $10^{-7}$ standard cubic centimeters of gaseous helium per second, a leak rate that is unacceptably high for the application contemplated. In contrast, the valve of the present invention has a leak rate of less than $10^{-13}$ sccm/sec., the sensitivity of the test equipment.

One alternative to conventional O-rings that was explored was the possibility of replacing the O-ring seal by a weld. Welding was not a suitable alternative because the parts to be welded were located in a relatively inaccessible part of the valve, which made it impossible to remove the welding oxidation, which remained as a source of contamination. Also, the welded valve could not be disassembled for repairs or cleaning, so welding the parts was not an acceptable solution.

Thus, the present invention arose out of the need for a seal that could be opened and closed a number of times and that when closed would have an unprecedented low leak rate.

SUMMARY OF THE INVENTION

In the valve of the present invention, the valve body includes a bore in which the stem of the valve is located. The valve seat is at the bottom of this bore, and the seat is selectively covered by a valve seat sealing member that can be raised and lowered within the bore to open and close the valve. The valve seat sealing member is connected to one end of a bellows that extends practically the entire length of the bore. The inside of the bellows is exposed to the ambient air, and the outside of the bellows is immersed in the gas that flows through the valve. The end of the bellows opposite from the valve seat sealing member must be sealed to the valve body in the vicinity of the entrance of the stem bore. It is this seal with which the present invention is concerned.

In accordance with the present invention, a conical bellows adapter is welded to the end of the bellows, and the metal-to-metal seal is formed by forcing the conical bellows adapter into the stem bore. In the preferred embodiment, the force is applied by a nut that bears against the conical bellows adapter. Expansion and contraction of the bellows for the purpose of closing and opening the valve is accomplished by a rod that extends through a bore in the central portion of the conical bellows adapter and extends the length of the bellows, and is connected to the bellows adapter to which the valve seat sealing member is attached. When this rod is drawn out of the stem bore, the valve seat sealing member is drawn away from the valve seat thereby opening the valve; and when the rod is pushed into the stem bore, the valve seat sealing member is pressed against the valve seat, thereby closing the valve. Movement of this rod in the axial direction of the stem bore is accomplished in the preferred embodiment by means of a threaded valve handle, although in other embodiments an electrical solenoid or a pneumatic or hydraulic piston can be employed.

Some significant advantages of the seal of the present invention cannot be seen from the drawings. For example, for the configurations considered o be within the scope of the present invention, the amount of torque that must be applied to the nut that forces the conical bellows adapter into the stem bore is unexpectedly modest, and this permits the valve to be assembled and taken apart with wrenches of ordinary dimensions. Further, it has been found that the amount of torque required to effect a high-quality seal is considerably less than the amount of torque required to produce permanent deformation of the sealing surfaces. This is an important advantage because it permits the sealing parts to be reused any number of times so long as grossly excessive torque is not applied.

Once the valve has been sealed, the metal-to-metal seal is seen to be located at the outer end of the stem bore, and although this region of the valve is "wet" by the gas flowing through the valve, nevertheless, the region is located far enough out of the mainstream that it would be exceedingly difficult to remove the oxidation from a weld located in that region. But, since the metal-to-metal seal of the present invention does not require a weld, the problem is completely avoided by the use of the present invention.

The novel features which are believed to be characteristic of the invention, both as to organization and method of operation, together with further objects and advantages.thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
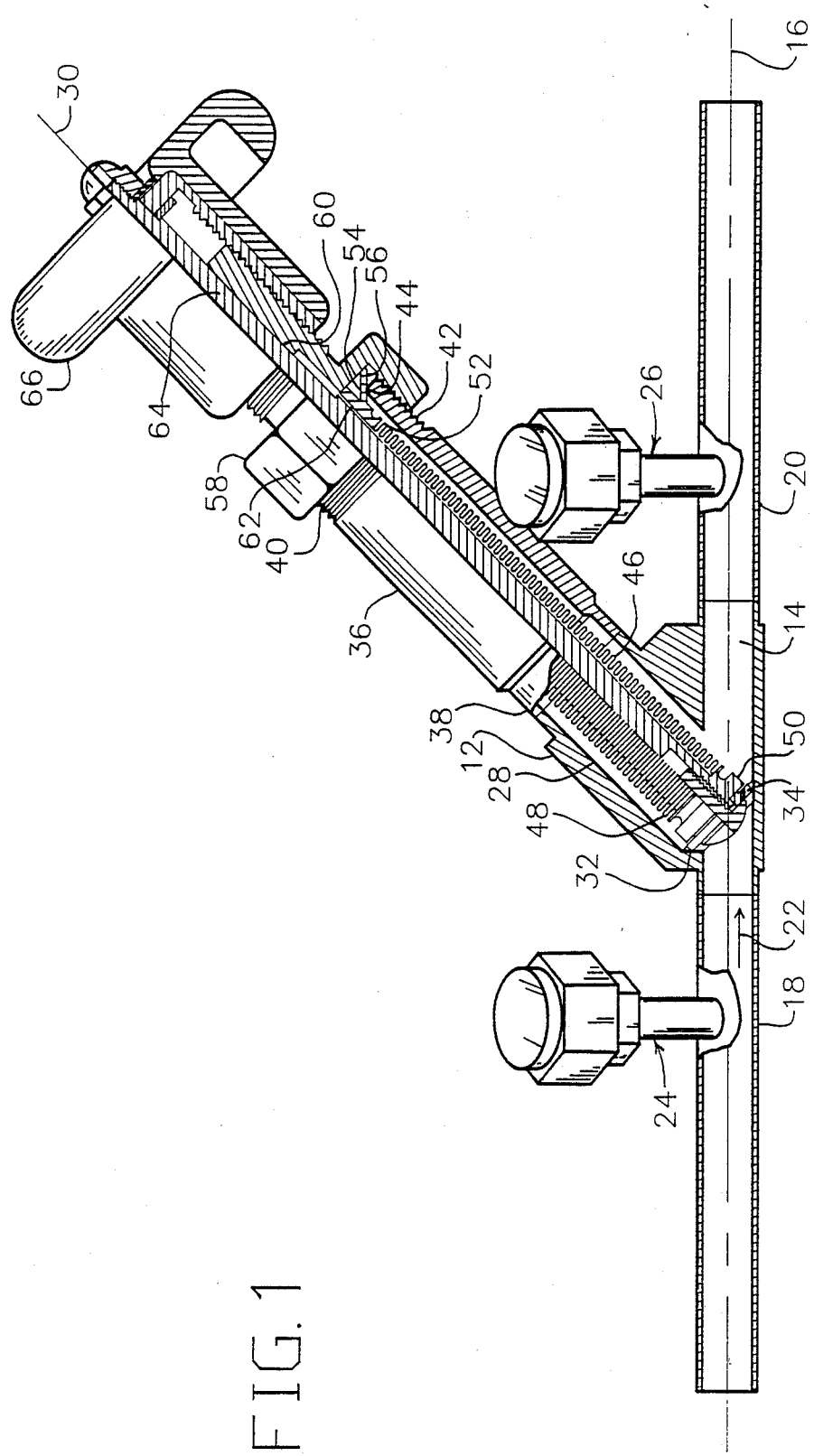
FIG. 1 is a side-elevational view partly in cross section showing the arrangement of the various parts within the valve of the preferred embodiment.

FIG. 1 shows a preferred embodiment of the clean gas valve of the present invention. The valve body 12 includes a first bore 14 that extends along a first axis 16. An inlet tube 18 and an outlet tube 20 are welded to the valve body 12 and form an extension of desired length to the first bore 14. The direction of flow is indicated by the arrow 22. The inlet tube 18 and the outlet tube 20 are provided with purge ports 24, 26.

The valve body 12 further includes a second bore 28, also referred to as the stem bore, which extends along a second axis 30 that intersects the first axis 16 at an acute angle. At the bottom of the second bore 28 is a valve seat surface 32 against which the valve seat sealing member 34 is pressed to close the valve. In a preferred embodiment the valve seat sealing member 34 is composed of KEL-F.

In the preferred embodiment of FIG. 1, a support tube 36, having a first end 38 and a second end 40 is welded to the valve body 12 to form an extension of the second bore 28. An externally-threaded portion of the support tube 36 lies adjacent the second end 40.

The valve seat sealing member 34 is attached to a lower bellows adapter 50, which in turn is welded to the bellows 46 at the first end 48 of the bellows. Similarly, the second end 54 of the bellows is welded to an upper bellows adapter 54 which includes a conical surface 56.

The metal-to-metal seal is formed between the conical surface 56 and the edge 44 of the support tube when the cap 58 is tightened against the upper bellows adapter 54, thereby forcing the conical surface 56 into the opening of the bore of the support tube 36. The cap 58 and the upper bellows adapter 54 include axial passages 60 and 62, respectively through which a control rod 64 extends. The control rod 64 is moved along the axis 30 as the handle 66 is rotated, and thereby extends and retracts the bellows 46 to close and to open the valve.

In an alternative embodiment, no separate support tube 36 is welded to the valve body 12. Instead, the support tube 36 is a unitary part of the valve body 12. In this alternative embodiment, it may be said that the metal-to-metal seal is formed between the conical surface 56 and the edge of of the second bore 28 of the valve body 12.

Figure 2:
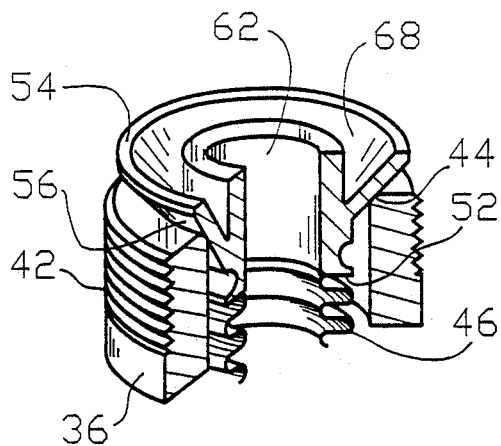
FIG. 2 is a fractional perspective view partly cut away to show the metal-to-metal seal of the valve of FIG. 1 more clearly.

FIG. 2 is an enlarged fractional perspective view showing the upper bellows adapter 54 and the manner in which it engages the edge 44 of the bore of the support tube 36 to form the metal-to-metal seal.

By experiment it was found that if either the bore of the support tube or the conical surface 56 of the upper bellows adapter 54 were out of round, an excessive amount of torque was required in tightening the cap 58 to effect a satisfactory seal. Rather than to require greater accuracy in the machining of the support tube and the upper bellows adapter, it was found preferable to render the upper bellows adapter more compliant by undercutting the conical surface 56 by means of the groove 68. This solution proved to be unexpectedly effective, and when the groove 68 is used, it is found that the sealing surfaces can be as much as 0.007 inch out of round and still a good seal can be obtained without having to use excessive torque on the cap 58.

Figure 3:
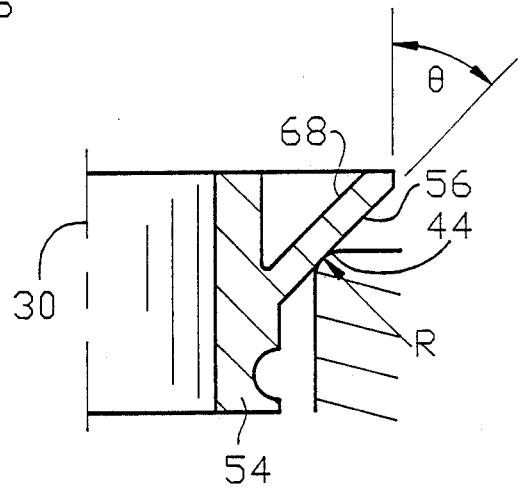
FIG. 3 is a diagram in which the dimensional variables R and $\theta$ are defined.

FIG. 3 is a diagram representing the sealing surfaces on an enlarged scale. The half-angle of the conical surface 56 is represented by the letter $\theta$, and the radius of curvature of the edge 44 is represented by the letter R. As might be expected, both of these variables are important in determining the amount of torque that must be applied to the cap 58 to effect a satisfactory seal, without requiring excessive torque and without permanently deforming the parts. In the preferred embodiment, the entire valve is composed of Type 316L stainless steel, including the upper bellows adapter 54 and the support tube 36.

Figure 4:
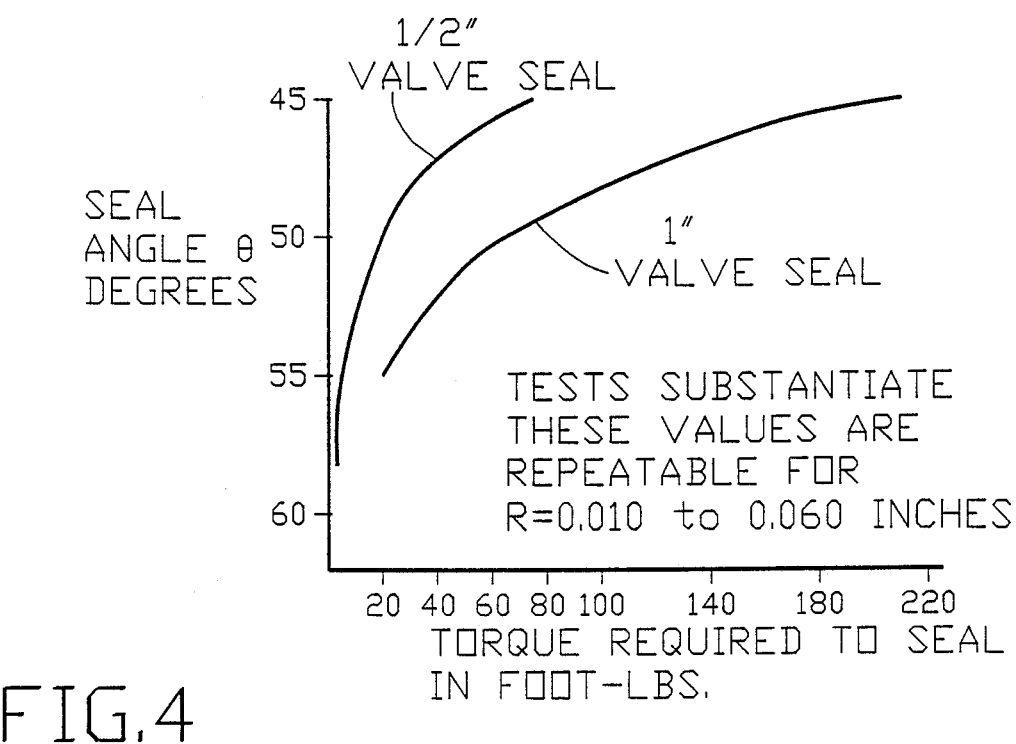
FIG. 4 is a graph showing how the torque required to effect the metal-to-metal seal is related to the variables R and $\theta$.

FIG. 4 is a graph showing how the amount of torque required varies with R and $\theta$. The graph of FIG. 4 was discovered by experimentation. From the graph of FIG. 4 it can be seen that the desirable range of $\theta$ is from 50 degrees to 60 degrees, and the more desirable range of R is from 0.01 to 0.06 inches.

Thus, there has been described a clean gas valve that has been made practical through the use of a unique metal-to-metal seal formed by forcing a conical plug into a circular bore. The design of such a seal has been described in detail.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A clean gas valve having an exceptionally low leak rate, comprising in combination:

a valve body including a first bore having a first axis that extends in the direction of flow, including a second bore having a second axis that intersects the first axis at an acute angle, said second bore intersecting said first bore, extending from said first bore and terminating at an edge, said body further including a valve seat surface;

a bellows adapter including a conical surface coaxial with the second axis, the conical surface extending partially into said second bore and bearing against the edge of said second bore, said bellows adapter including a groove that undercuts the conical surface to enhance the compliance of the conical surface to the edge of said second bore;

a valve seat sealing member adapted to seal against the valve seat surface of said valve body;

a bellows having a first end attached to said valve seat sealing member and having a second end attached to said bellows adapter;

first means attached to said valve body and bearing against said bellows adapter so as to force the conical surface of said bellows adapter tightly against the edge of said second bore, whereby a metal-to-metal seal is formed between said edge and said bellows adapter, said first means including a passage extending through it and coaxial with said second axis;

said bellows adapter further including a passage extending through it and coaxial with said second axis and opening into the space within said bellows;

whereby the gas comes in contact with said valve seat sealing member, with the second bore of said valve body, and with the outside of said bellows, but is prevented by the metal-to-metal seal from coming into contact with the inside of said bellows, whereby said valve remains sealed even as said bellows is extended and retracted to close and to open said valve.

2. The clean gas valve of claim 1 further comprising in combination:

second means attached to said valve body, extending through the passage of said first means and through the passage of said bellows adapter and connected to said valve seat sealing member for selectively pushing and pulling said valve seat sealing member along the second axis to close and to open said valve.

3. The clean gas valve of claim 1 further comprising in combination:
  second means attached to said first means, extending through the passage of said first means and through the passage of said bellows adapter and connected to said valve seat sealing member for selectively pushing and pulling said valve seat sealing member along the second axis to close and to open said valve.

4. The clean gas valve of claim 1 wherein the half-angle $\theta$ of the conical surface is an angle between 50 degrees and 60 degrees.

5. A clean gas valve having an exceptionally low leak rate, comprising:
  a valve body including a first bore concentric about a first axis that extends in the direction of flow, including a second bore having a second axis that intersects the first axis at an acute angle, and including a valve seat surface;
  a support tube including a first end attached to said valve body with the bore of said support tube coaxial with the second axis, including a second end, and including an externally threaded portion adjacent the second end;
  a bellows adapter including a conical surface having an axis coaxial with the second axis, the conical surface extending partially into the second end of said support tube and bearing against the edge of the bore of said support tube, said bellows adapter including a groove that undercuts the conical surface to enhance the compliance of the conical surface to the edge of said second bore;
  a valve seat sealing member adapted to seal against the valve seat surface of said valve body;
  a bellows having a first end attached to said valve seat sealing member and having a second end attached to said bellows adapter;
  a cap engaging the threads of the second end of said support tube and bearing against said bellows adapter when drawn up tightly, so as to force the conical surface of said bellows adapter tightly against the edge of the bore of said support tube, whereby a metal-to-metal seal is formed between said support tube and said bellows adapter, said cap further including an axial passage extending through it;
  said bellows adapter further including an axial passage extending through it and opening into the space within said bellows;
  whereby the gas comes in contact with said valve seat sealing member, with the second bore of said valve body, with the bore of said support tube, and with the outside of said bellows, but is prevented by the metal-to-metal seal from coming into contact with the inside of said bellows, whereby said valve remains sealed even as said bellows is extended and retracted to close and to open said valve.

6. The clean gas valve of claim 5 further comprising in combination:
  means attached to said cap, extending through the axial passage of said cap and through the axial passage of said bellows adapter and connected to said valve seat sealing member, for selectively pushing and pulling said valve seat sealing member along the second axis with respect to said cap to close and to open said valve.

7. The clean gas valve of claim 4 wherein the half-angle $\theta$ of the conical surface is an angle between 50 degrees and 60 degrees.

* * * * *